United States Patent
Xu et al.

(10) Patent No.: US 8,594,669 B2
(45) Date of Patent: Nov. 26, 2013

(54) METHOD FOR HOME BASE STATION TO ACCESS NETWORK AND HOME BASE STATION MANAGEMENT SERVER

(75) Inventors: Yunxiang Xu, Shenzhen (CN); Yuexin Dong, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 102 days.

(21) Appl. No.: 13/394,169

(22) PCT Filed: Jun. 30, 2010

(86) PCT No.: PCT/CN2010/074864
§ 371 (c)(1),
(2), (4) Date: Mar. 5, 2012

(87) PCT Pub. No.: WO2011/057500
PCT Pub. Date: May 19, 2011

(65) Prior Publication Data
US 2012/0172040 A1 Jul. 5, 2012

(30) Foreign Application Priority Data
Nov. 10, 2009 (CN) .......................... 2009 1 0237323

(51) Int. Cl.
*H04W 4/00* (2009.01)
(52) U.S. Cl.
USPC ..................... 455/435.1; 455/435.2; 455/411; 455/420; 455/410; 455/444
(58) Field of Classification Search
USPC ............ 455/435.1, 410, 411, 420, 435.2, 444
See application file for complete search history.

(56) References Cited

U.S. PATENT DOCUMENTS

| 6,535,493 B1 | 3/2003 | Lee et al. | |
|---|---|---|---|
| 2010/0075635 A1* | 3/2010 | Lim et al. | 455/411 |

FOREIGN PATENT DOCUMENTS

| CN | 101437223 A | 5/2009 |
|---|---|---|
| CN | 101562805 A | 10/2009 |
| EP | 1885084 A1 | 2/2008 |

OTHER PUBLICATIONS

International Search Report (in Chinese with English translation) for PCT/CN2010/074864, mailed Oct. 28, 2010; ISA/CN.

* cited by examiner

*Primary Examiner* — Khalid Shaheed
(74) *Attorney, Agent, or Firm* — Harness, Dickey & Pierce, PLC

(57) ABSTRACT

A method for accessing a network by a home base station and a home base station management server for a home base station to access a network are provided, wherein the method includes: the home base station management server receivinges a registrationer request sent from the home base station through by a communication link between the home base station management server and the home base station; the home base station management server determines judging whether to allow the home base station to access the network; the user authentication and registration information including: a security key and access port information; after allowing the access of the home base station, the home base station management server configuring a frequency of the home base station; and after finishing frequency configuration, the home base station management server configuring a radio parameter of the home base station.

13 Claims, 6 Drawing Sheets

METHOD FOR HOME BASE STATION TO ACCESS NETWORK AND HOME BASE STATION MANAGEMENT SERVER

CROSS-REFERENCE TO RELATED APPLICATIONS

This application is a 371 U.S. National Stage of International Application No. PCT/CN2010/074864, filed Jun. 30, 2010, and claims priority to Chinese patent application No. 200910237323.1, filed Nov. 10, 2009, the disclosures of which are herein incorporated by reference in their entirety.

TECHNICAL FIELD

The present invention relates to the wireless communication field, and particularly, to a method for accessing a network by a home base station and a home base station management server.

BACKGROUND OF THE RELATED ART

The home base station has different names in different standard organizations, which is called as Home Node B (HNB)/Home Evolved Node B (HeNB) (the home base station of the Third Generation mobile communication technology (3G) is called as HNB, and the base station of Long Time Evolution (LTE) is called as HeNB) in Third Generation Partnership Project (3GPP) standards organization, and is called as Femto (a general name of all types of home base stations) in other standard organizations such as the Third Generation Partnership Project 2 (3GPP2). In fact, they are essentially the same, and are all femtocells. The home base station is a miniature and low-power cellular base stations, which are mainly applies in indoor places such as home and office. The function of it is to act as supplementary of the indoor coverage of a cellular network and provides voice and data service for users.

The term of Femto Cell is initially proposed by British Ubiquisys Company, and is originated from the deficiency of the early coverage of the Third Generation mobile communication technology (3G) and the challenge of the Wireless Fidelity (Wi-Fi) technology. The emphasis of network construction of the 3G in the initial stage of development is outdoor coverage, but the requirements for indoor communication of the users usually cannot be well satisfied. Especially, the Wi-Fi technology is rapidly generalized in recent years and the Wi-Fi/cellular dual-mode cellphones are continuously increased, but the 3G voice and data services have a risk of being offloaded. In this case, the concept of Femto Cell is followed by mobile operators since it was proposed. With this new technology and terminal, the mobile operators can enter into the market of home and office places which were formally controlled by the fixed network and the Wi-Fi network.

Femto Cell is able to automatically complete configuration and automatically start work through a broadband circuit connection such as an existing Asymmetric Digital Subscriber Line (ADSL) and Local Area Network (LAN), etc., and a connection of the remote end from the Internet protocol (IP) to the mobile network implemented by a dedicated gateway. It has a figure that is similar to the Wi-Fi, and may be applied separately or may be integrated in the home gateway as a part of the home network. Meanwhile, Femto Cell is a new technology which implements the fixed mobile convergence, and is the best way to implement the Fixed Mobile Convergence (FMC), which helps mobile operators maximize their benefits and reduce the dependence on the cellular/Wi-Fi dual-mode cellphone, so as to provide differentiated services. Today, with the trend of fixed mobile convergence increasing, the development of Femto Cell even becomes the focus of the industry.

The site registration and authentication will be involved in the process of the home base station accessing the network. The home base station is generally fixed in one place for use at present, and when performing site registration and authentication, a port problem will not be involved, however, once the home base station moves to other areas, the problem that the home base station is unable to access the network caused by the home base station locating in other areas besides the registration place.

SUMMARY OF THE INVENTION

The object of the present invention is to provide a method for accessing a network by a home base station and a home base station management server, so as to solve the problem that the home base station is unable to access the network caused by the home base station locating in other areas besides the registration place, and the method for accessing a network by a home base station comprises:

a home base station management server receiving a registration request sent by the home base station through a communication link with the home base station;

the home base station management server judging whether to allow access of the home base station according to user authentication and registration information in the registration request; the user authentication and registration information including: a security key and access port information;

after allowing the access of the home base station, the home base station management server configuring a frequency of the home base station; and after finishing frequency configuration, the home base station management server configuring a radio parameter of the home base station.

The access port information includes: a home base station registration port list and user registration information of the home base station;

in the step of the home base station management server determining whether to allow access of the home base station according to user authentication and registration information in the registration request, and if the security key passes the authentication, and if an access port of the home base station is a registration port in the home base station registration port list or the user registration information indicates to allow access of other ports besides the registration port of the home base station, the access of the home base station is allowed.

The step that if the access port of the home base station is the registration port in the home base station registration port list or the user registration information indicates to allow access of other ports besides the registration port of the home base station, the access of the home base station is allowed, comprises:

the home base station management server judging whether the security key could pass the authentication, and if the security key could not pass the authentication, a process of authentication and registration ending; if the security key could pass the authentication, the home base station management server judging whether the access port of the home base station is the registration port, and if the access port of the home base station is the registration port, allowing the access of the home base station, if the access port of the home base station is not the registration port, the home base station management server judging the user registration information indicates whether to allow the access of the home base station by other port besides the registration port, and if the user registration information indicates to allow the access of the home base station by other port besides the registration port, allowing the access of the home base station, if the user registration information indicates not to allow the access of the home base station by other port besides the registration port, not allowing the access of the home base station.

The frequency includes: a registered frequency and a public frequency.

The step of configuring the frequency of the home base station comprises:

the home base station management server judging whether a current area where the home base station is located is a user registration area according to area position information corresponding to the access port information included in the user authentication and registration information of the home base station;

when determining that the current area of the home base station is the user registration area, the home base station management server sending a registration permission message including the registration frequency information list of the current area to the home base station; when determining that the current area of the home base station is not the user registration area, the home base station management server sending a registration permission message including the public frequency to the home base station;

the home base station management server indicating the home base station to select the frequency in the registration permission message; and the home base station management server receiving feedback information of a selection result for the frequency by the home base station.

When the home base station pre-stores a used frequency, the user authentication information further includes the used frequency, and after the step of the home base station management server sending the registration permission message including the registration frequency information list of the current area to the home base station, and before the step of the home base station management server indicating the home base station to select the frequency in the registration permission message, the method further comprises:

the home base station management server judging whether the used frequency is available in the current area, and if the used frequency is available in the current area, arranging the used frequency at front of the registered frequency information list.

The step of configuring the radio parameter of the home base station comprises:

the home base station management server determining an access point of the home base station and the home gateway according to the configured frequency and the area position information corresponding to the access port information, so as to make the home base station establish a control plane interface/user plane interface S1-C/U connection with the home gateway;

the home base station management server determining a configuration strategy of the radio parameter of the home base station according to the frequency, the area position information and user subscription information;

the home base station management server determining a controllable parameter in the radio parameters according to the frequency, the area position information and the user subscription information;

the home base station management server providing the controllable parameter to a user so as to make the user configure the controllable parameter; and the home base station management server receiving a configuration result fed back by the home base station.

The present invention further provides a home base station management server, comprising:

a first receiving module, which is configured to: receive a registration request sent by a home base station through a communication link between the home base station management serve and the home base station;

a judging module, which is configured to: judge whether to allow access of the home base station according to user authentication and registration information in the registration request; wherein the user authentication and registration information includes: a security key and access port information;

a frequency configuring module, which is configured to: configure a frequency of the home base station after allowing the access of the home base station; and a radio parameter configuring module, which is configured to: configure a radio parameter of the home base station after completing configuration of the frequency.

The access port information includes: a home base station service closed user list and user registration information of the home base station;

the judging module is configured to:

if the security key passes authentication, and if an access port of the home base station is a registration port in a home base station registration port list, or the user registration information indicates to allow access of other ports besides the registration port of the home base station, allow the access of the home base station.

The judging module comprises: a first judging unit, a second judging unit and a third judging unit;

the first judging unit is configured to: judge whether a security key could pass authentication; and if the security key could pass the authentication, the second judging unit operates, if the security key could not pass the authentication, a process of authentication registration ends;

the second judging unit is configured to: judge whether the access port of the home base station is the registration port, and if the access port of the home base station is the registration port, allow the access of the home base station, if the access port of the home base station is not the registration port, the third judging unit operates;

the third judging unit is configured to: judge whether the user registration information allows the home base station to access a network by other ports besides the registration port, and if the user registration information allows the home base station to access the network by other ports besides the registration port, execute the access, if the user registration information does not allow the home base station to access the network by other ports besides the registration port, do not allow the access of the home base station.

The frequency includes: a registered frequency and a public frequency.

The frequency configuring module comprises:

a fourth judging unit, which is configured to: judge where a current area where the home base station is located is a user registered area according to area position information corresponding to the access port information included in the user authentication and registration information of the home base station;

a sending unit, which is configured to: send a registration permission message including the registration frequency information list of the current area to the home base station when determining that the current area of the home base station is the user registered area, or send a registration permission message including the public frequency when determining that the current area of the home base station is not the user registered area;

an indicating unit, which is configured to: indicate the home base station to select the frequency in the registration permission message; and a second receiving unit, which is configured to: receive feedback information of a selection result for the frequency by the home base station.

The radio parameter configuring module comprises:

an access point judging unit, which is configured to: determine an access point of the home base station and the home gateway according to the configured frequency and the area position information corresponding to the access port information, so as to make the home base station establish a control plane interface/user plane interface S1-C/U connection with the home gateway;

a radio parameter configuring strategy determining unit, which is configured to: determine a configuration strategy of the radio parameter of the home base station according to the frequency, the area position information and user subscription information;

a controllable parameter determining unit, which is configured to: determine a controllable parameter in the radio parameters according to the frequency, the area position information and the user subscription information;

a controllable parameter providing unit, which is configured to: provide the controllable parameter to a user so as to make the user configure the controllable parameter; and a third receiving unit, which is configured to: receive feedback information of a configuration result, wherein the configuration result includes: a connection point information of the S1-C/U connection and information of successful configuration of the controllable parameter by the user.

Compared with the related art, the present invention has the following beneficial effects.

The present invention proposes a corresponding method for the frequency selection, site registration and authentication, and radio parameter configuration of the networking of the home base station network and the like according a series of requirements of the networking of the home base station.

The method of the present invention considers the access port information of the home base station, and the home base station management server will judge whether to allow the access of the home base station according to the access port information. That is to say, the user may freely move the home base station as required and make it access the network by using the access method of the present invention, thereby changing the limitation caused by the existing home base station being fixed in one place for using and accessing the network.

The frequency selection range in the access method of the present invention is wider, and two types of frequencies, i.e., the registration frequency and the public frequency, are provided to the home base station for configuration, but the frequency selection range is not limited to the frequency band stimulated a protocol. And the home base station may store the used frequencies for further selection.

The home base station management server may interact with the home base station in the access method of the present invention, and the user is able to control the configuration of the radio parameter to make the configured parameter to be more suitable for requirements of the user and make the process of parameter configuration to be more flexible.

PREFERRED EMBODIMENTS OF THE PRESENT INVENTION

The object of the access of the home base station equipment is to provide services of corresponding mobile services to a mobile terminal, so as to solve problems such as blind spots coverage and extension of the mobile service of the operator. For the proposed problem of extension of the mobile service, the home base station needs to have certain features of mobility and plug-and-play, so a series of control requirements are proposed for the network parallel operation of the home base station, and the requirements includes: registration and authentication network parallel operation and equipment parameter configuration of the home base station, and so on.

The different areas access of the home base station or the control of the home base station user on the equipment needs to consider the control authority issue of users, and different users in different areas have different control levels for the parameters of the equipment.

The features of plug-and-play of the home base station must cause unnecessary interference on the operation of the existing network, and therefore, the interference on the existing network should be reduced as much as possible on the selection of the frequency. Furthermore, the available frequencies for the operators in different areas are different, and the mobility of the feature of plug-and-play of the home base station of users must be controllable for the operator on the selection of the frequency, so as to avoid committing local laws.

The present invention proposes a corresponding method for the site registration and authentication, frequency selecting and radio parameter configuration of networking of the home base station network and the like according a series of requirements of the home networking.

The specific embodiments of the present invention will be further described in detail in combination with drawings as follows.

Figure 1:
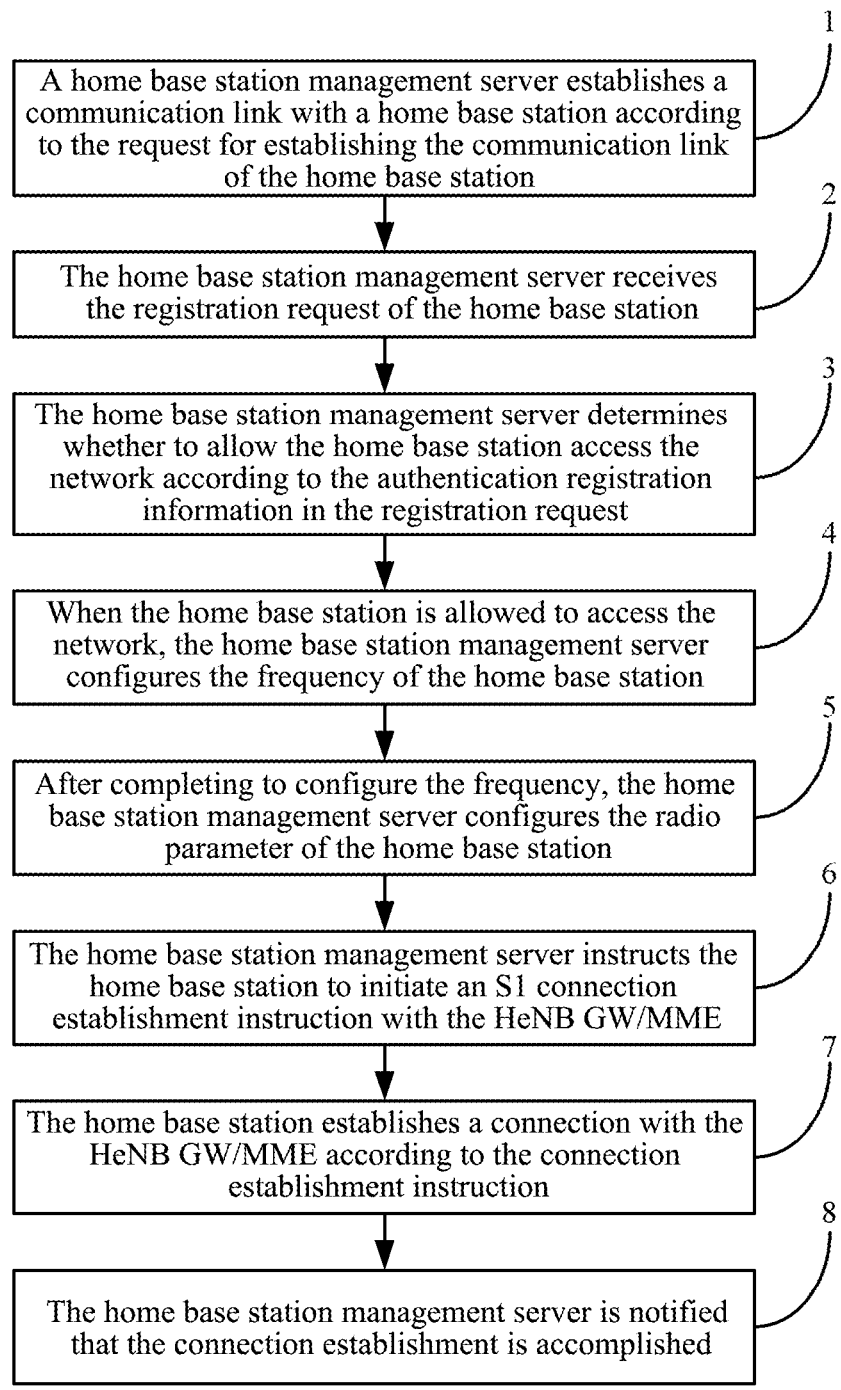
FIG. 1 is a flowchart of the method for accessing the network by the home base station according to the present invention.

Refer to FIG. 1, which is a flowchart of the method for accessing the network by the home base station according to the present invention, and the method comprises the following steps.

In step 1, a home base station management server establishes a communication link with a home base station according to the request of the home base station for establishing the communication link.

The home base station autonomously establishes the communication link with the home base station management server according to the access port address of the home base station management server after being powered up. The access port address of the home base station management server is included in the user subscription data, and this address may be solidified in the home base equipment or stored in an external plug and play digital equipment. The access port address of the home base station management server may be not unique, and the home base station selects port addresses in turn according to a list to establish a communication link.

In step 2, the home base station management server receives the registration request of the home base station.

The home base station initiates a registration request to the home base station management server, wherein the registration request includes: user authentication and registration information and access position information of the home base station, wherein the position information may be the geographical position information where the home base station is located, e.g., the global positioning system (GPS) parameter, or IP address information provided by the relevant service operator when the home base station accesses the network, and so on.

In step 3, the home base station management server judges whether to allow the home base station to access the network according to the user authentication and registration information in the registration request.

The user authentication and registration information includes: a security key and access porting information; the home base station management server judges whether the home base station has a capability of accessing the network so as to provide a wireless service according to the user authentication and registration information, wherein the security key may be stored in an external plug-and-play digital equipment.

The access port information specifically includes a home base station service closed user list, wherein the list stores the default user terminal equipments that are allowed to access the service coverage area provided by the home base station, and other mobile terminal equipments besides those need to determine whether to allow the access of the terminal equipment according to the current state of the home base station; when the home base station is in the closed state, only the access of the terminal equipments in the list is allowed; when the home base station is in the open state, the access of other user terminal equipments registered in the operator's network is also allowed besides the access of terminal equipments in the list is allowed; when the home base station is in the mixed state, the access of temporary terminal equipments set by the home base station administrator is also allowed besides the access of equipments in the list is allowed.

In an access port list of the home base station equipment registration position access, the included access port information of the home base station equipment registration is ports that allow the default access of the terminal equipments.

The judgment information for whether the home base station allowing access of other ports besides the registration port specifically includes: when a user registers as that the access from other ports besides the registration port is allowed, and the home base station may access any network access port and be activated.

Figure 2:
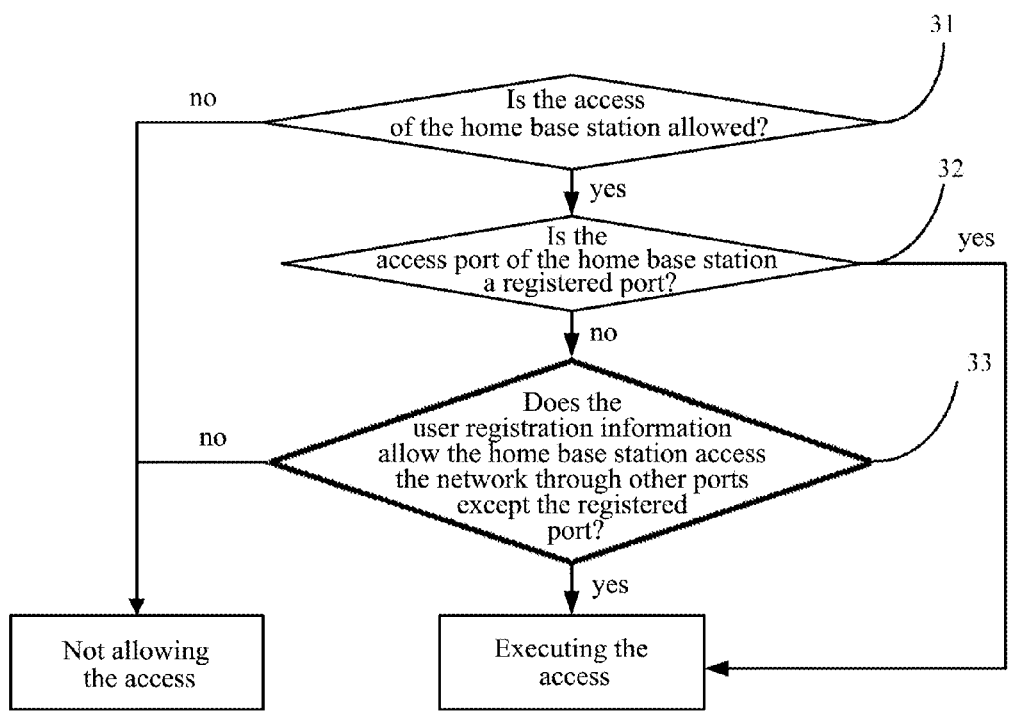
FIG. 2 is a flowchart of step 3 according to the present invention.

Refer to FIG. 2, which is a flowchart of step 3, and the step 3 specifically comprises following steps.

In step 31, the home base station management server judges whether the security key could pass authentication, and if it could pass the authentication, step 32 is executed, or else, the access is not allowed, and the process of authentication and registration ends.

In step 32, the home base station management server judges whether the access port of the home base station is a registration port, and if yes, the access of the home base station is allowed, or else, step 33 is executed.

Step 33, the home base station management server judges whether the user registration information allows the home base station to access the network from other ports besides the registration port, and if it allows, the access is executed, or else, the access is not allowed.

Of course, steps 31~33 are only a method for implementing the access of home base station, alternatively, it also can judge the information of the access port of the home base station, and then judge whether to allow the access according to the security key, that is to say, the access of the home base station may be implemented in the cases that the security key could pass the authentication, and, the access port of the home base station is a registration port or the user registration information indicates to allow the access of other ports besides the registration port of the home base station.

In step 4, when the home base station is allowed to access the network, the home base station management server configures the frequency of the home base station.

The frequency of the home base station includes two available frequency lists, respectively corresponding to the registration frequency list and public frequency list, provided by operators for the registered user equipments, wherein the frequency in the registration frequency list is a frequency resource registered and purchased by the operator in a certain area, while the public frequency list is a frequency resource that may be used free of charge in the present area.

The registration port mentioned in this embodiment is the registration port in the home base station registration port list included in the access port information; the home base station registration port list includes the above-mentioned home base station service closed user list and an access port list of the home base station equipment registration position.

Figure 3:
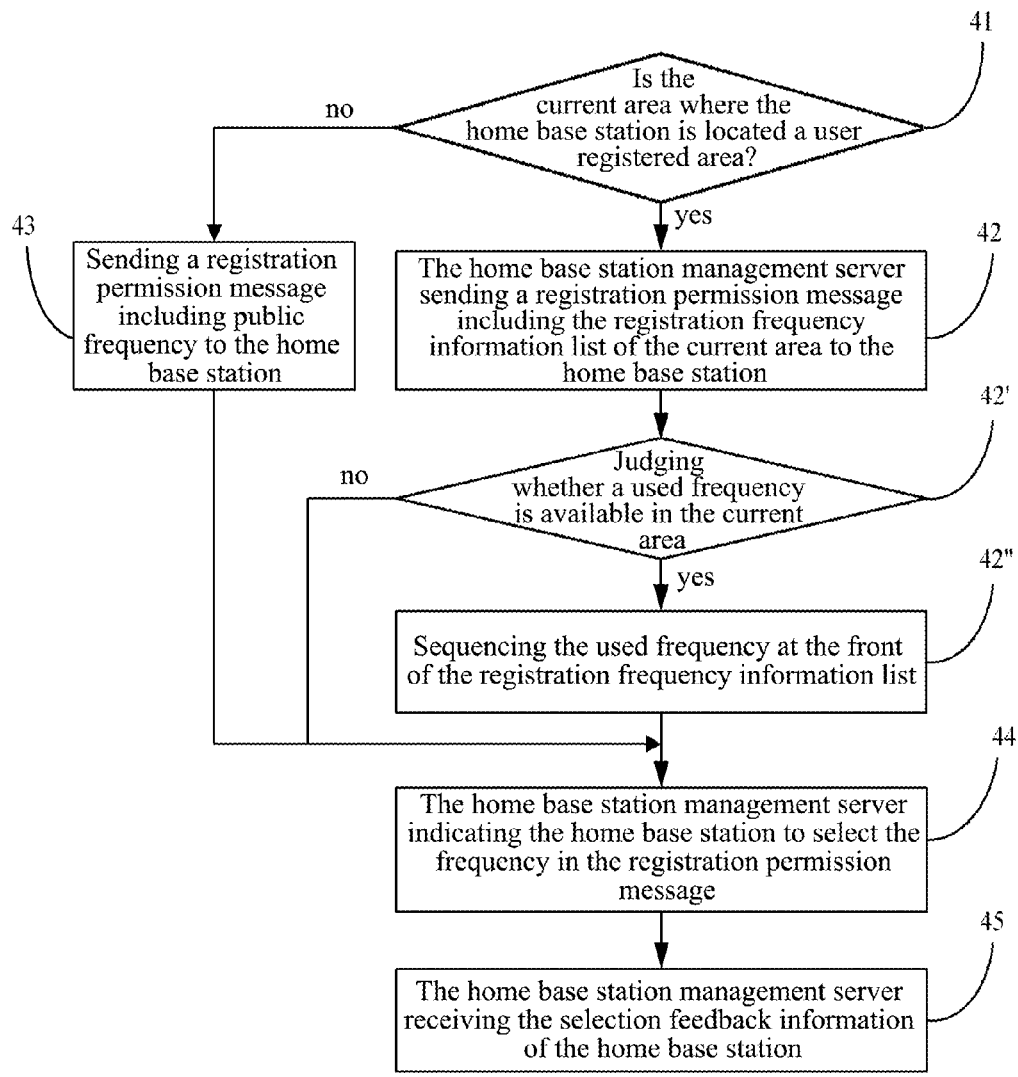
FIG. 3 is a flowchart of step 4 according to the present invention.

Refer to FIG. 3, which is a flowchart of step 4, and the step 4 specifically comprises following steps.

In step 41, the home base station management server judges whether the present area where the home base station is located is a user registration area according to the area position information corresponding to the access port information included in the user authentication and registration information of the home base station, and if yes, step 42 is executed, or else, step 43 is executed.

In step 42, the home base station management server sends a registration permission message including the registration frequency information list of the current area to the home base station.

In step 43, the home base station management server sends a registration permission message including the public frequency.

In step 44, the home base station management server indicates the home base station to select the frequency in the registration permission message.

The way of the selection may be automatic selection, or may be manual selection.

The rule for automatic selection may be a minimal interference criteria, that is, the home base station scans the reception levels of all frequencies, and takes the frequency with the minimal reception level as the selected object, or a threshold judgment criteria, that is, a threshold value of the reception level is set, and the reception levels of all frequencies are judged in turn, and the first frequency that satisfies the threshold value is taken as the selected object.

Further, the user authentication and registration information of the home base station also includes used frequencies, the used frequency is stored in the home base station, and at this point, after the step 42 and before the step 44, it is further comprises following steps.

In step 42', the home base station management server judges whether the used frequency is available in the present area, and if it is available, step 42' is executed, or else, step 44 is directly executed.

In step 42", the used frequency is arranged at the front of the registration frequency information list, and step 44 is executed.

In step 45, the home base station management server receives the selection feedback information of the home base station.

In step 5, the home base station management server configures other radio parameters of the home base station after completing the configuration of the frequency.

Figure 4:
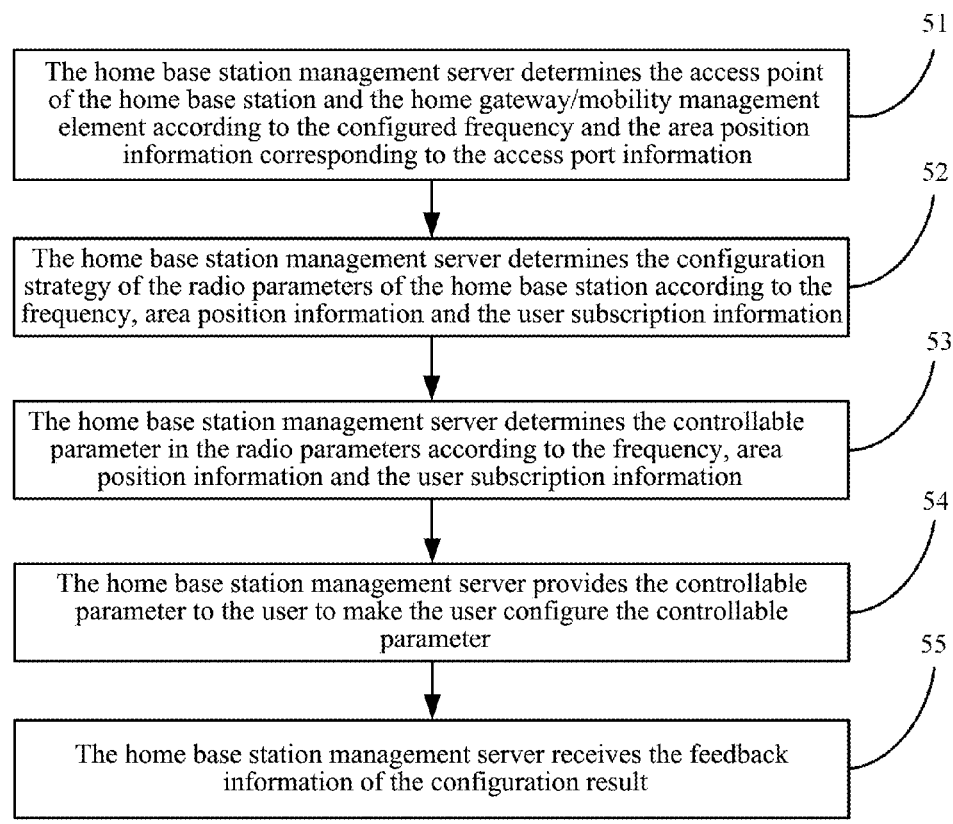
FIG. 4 is a flowchart of step 5 according to the present invention.

Refer to FIG. 4, which is a flowchart of step 5, and the step 5 specifically comprises following steps.

In step 51, the home base station management server determines the access point of the home base station and the home gateway/mobility management element according to the configured frequency point and the area position information corresponding to the access port information, to make the home base station establish the connection with the control plane interface/user plane interface (S1-C/U) of the home gateway.

In step 52, the home base station management server determines the configuration strategy of the radio parameter of the home base station according to the frequency, area position information and the user subscription information.

The configuration strategy of the radio parameter is the range of transmission power of the home base station or the maximal transmission power of the terminal in the service range of the home base station, and so on.

In step 53, the home base station management server determines the controllable parameter in the radio parameters according to the frequency, area position information and the user subscription information.

The ranges of the controllable parameters in different scenarios are different.

In step 54, the home base station management server provides the controllable parameter to the user to make the user configure the controllable parameter.

The controllable parameter may be provided to the user by a human-machine interaction interface, and the human-machine interaction interface displays the classification and control range of the controllable parameter so that the user may configure the controllable parameter.

Step 55, the home base station management server receives the feedback information of the configuration result.

After the home base station management server transfers the parameter control to the home base station, the home base station needs to feed back the configuration result to the home base station management server no matter whether the home base station configures the parameter automatically or configures the parameter under the intervention of the user, and the configuration result fed back to the home base station management server includes: the connection point information between the home base station and the home gateway/mobility management element and information of successful configuration of other radio parameters.

The home base station has the capability of radio transmission and reception until the home base station management server completes the above radio parameter configuration, and so far, the home base station is activated successfully.

The home base station is activated successfully, and then is made to establish the capability of communication with the relevant Home Evolved Node B GateWay (HeNBGW) or the Mobility Management Entity (MME) according to the access point configured in the step 51, and then the following steps are continued.

In step 6, the home base station management server indicates the home base station to initiate an S1 connection establishment indication with the HeNB GW/MME.

In step 7, the home base station establishes a connection with the HeNB GW/MME according to the connection establishment indication.

In step 8, the home base station completes the S1 connection establishment with the HeNB GW/MME, and then notifies the home base station management server that the connection establishment is accomplished.

Upon the home base station management server receiving the S1 port link establishment completion message from the home base station, it denotes that the home base station has finished the operation of accessing the network.

During the operation process of the home base station, the user is allowed to modify the relevant parameters of the home base station, and after completing the modification by the user, a confirmation with the home base station management server is needed. During the operation process of the home base station, the home base station management server is also allowed to modify the relevant parameter of the home base station.

Figure 5:
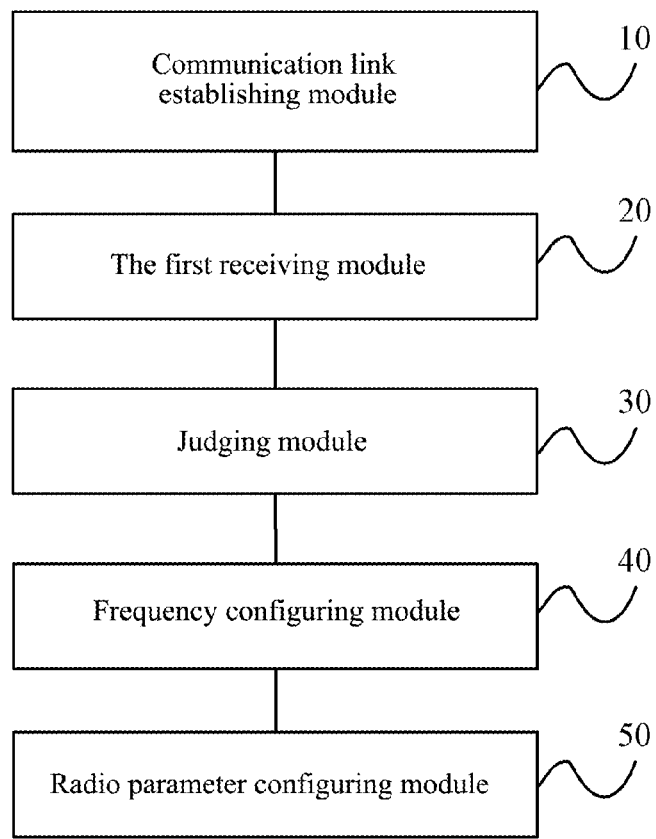
FIG. 5 is a schematic diagram of the structure of the home base station management server according to the present invention.

The structure of the home base station management server will be described in detail as follows with reference to FIG. 5. The home base station management server of the present invention comprises: a communication link establishing module 10, a first receiving module 20, a judging module 30, a frequency configuring module 40 and a radio parameter configuring module 50.

The communication link establishing module is configured to establish a communication link with the home base station according to the request of the home base station for establishing the communication link.

The home base station autonomously establishes the communication link with the home base station management server according to the access port address of the home base station management server after being powered up. The access port address of the home base station management server is included in the user subscription data, and this address may be solidified in the home base station equipment or stored in the external plug-and-play digital equipment. The access port address of the home base station management server may be not unique, and the home base station selects port addresses in turn according to a list to establish a communication link.

The first receiving module is configured to receive the registration request of the home base station.

Furthermore, the above-mentioned communication link establishing module and the first receiving module may be integrated into a single module, and this module is configured to receive the registration request sent by the home base station based on the communication link with the home base station.

The home base station initiates a registration request to the home base station management server, wherein the registration request includes: user subscription and registration information, access position information of the home base station and IP address information provided by the relevant service operator when the home base station accesses the network, wherein the position information may be: the geographical position information where the home base station is located, i.e., the GPS parameter.

The judging module is configured to judge whether to allow the home base station to access the network according to the user authentication and registration information in the registration request; the user authentication and registration information includes: a security key and access port information.

The home base station management server determines whether the home base station has a capability of accessing the network so as to provide a wireless service according to the user authentication and registration information, wherein the security key may be stored in an external plug-and-play digital equipment.

The access port information specifically includes a home base station service closed user list, wherein the list stores the default user terminal equipments that are allowed to access the service coverage area provided by the home base station, and other mobile terminal equipments besides those need to determine whether to allow the access of the terminal equipment according to the current state of the home base station; when the home base station is in the closed state, only the access of the terminal equipments in the list is allowed; when the home base station is in the open state, the access of other user terminal equipments registered in the operator's network is also allowed besides the access of terminal equipments in the list is allowed; when the home base station is in the mixed state, the access of temporary terminal equipments set by the home base station administrator is also allowed besides the access of equipments in the list is allowed.

In an access port list of the home base station equipment registration position, the included access port information of the home base station equipment registration is ports that allow the default access of the terminal equipments.

The judgment information for whether the home base station allows the access of other ports besides the registration port specifically includes: when a user registers as that the access from other ports besides the registration port is allowed, and the home base station may access any network access port and be activated.

The frequency configuring module is configured to: configure the frequency of the home base station after allowing the home base station to access the network; the frequency of the home base station includes two available frequency point lists, respectively corresponding to a registration frequency list and a public frequency list, provided by operator for the registered user equipment, wherein the frequency in the registration frequency list is a frequency resource registered and purchased by the operator in a certain area, while the public frequency list is a frequency resource may be used free of charge in the present area.

The radio parameter configuring module is configured to: configure other radio parameter of the home base station after completing the configuration of the frequency.

Figure 6:
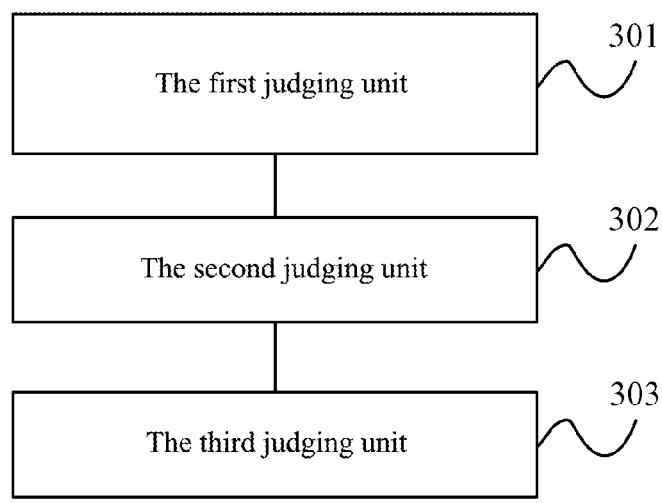
FIG. 6 is a schematic diagram of the structure of the judging module of the home base station management server according to the present invention.

Refer to FIG. 6, which is a schematic diagram of the structure of the judging module of the home base station management server according to the present invention, and the judging module 30 specifically comprises: a first judging unit 301, a second judging unit 302 and a third judging unit 303.

The first judging unit is configured to: judge whether the security key could pass authentication, and if it could pass the authentication, the second judging unit or the third judging unit operates, if it could not pass the authentication, the process of authentication and registration ends.

The second judging unit is configured to: judge whether the access port of the home base station is a registration port, and if the access port of the home base station is a registration port, allow the access of the home base station, if the access port of the home base station is not a registration port, the third judging unit operates.

The third judging unit is configured to: judge the user registration information indicate whether to allow the home base station to access the network by other ports besides the registration port, and if the user registration information indicates that the home base station is allowed to access the network by other ports besides the registration port, execute the access, if the user registration information indicates that the home base station is not allowed to access the network by other ports besides the registration port, do not allow the access of the home base station.

Figure 7:
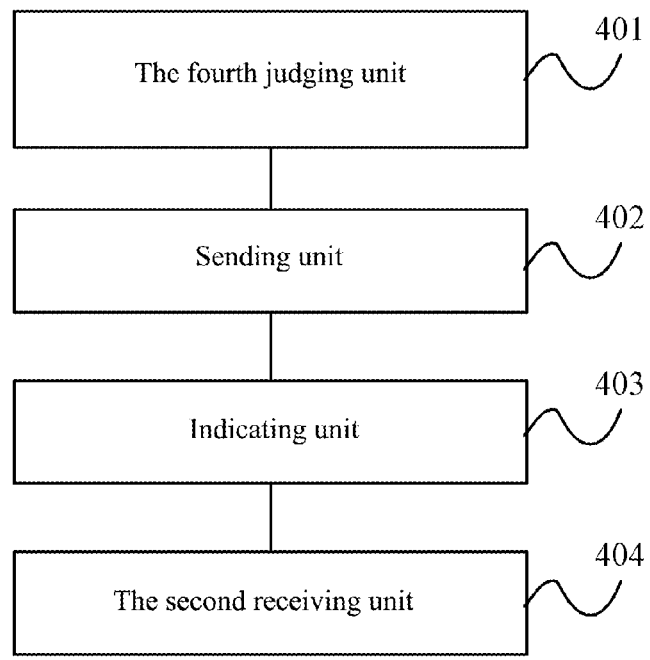
FIG. 7 is a schematic diagram of the structure of the frequency configuring module of the home base station management server according to the present invention.

Refer to FIG. 7, which is a schematic diagram of the structure of the frequency configuring module of the home base station management server according to the present invention, and the frequency configuring module 40 specifically comprises:

a fourth judging unit 401, which is configured to determine the current area where the home base station is located according to the area position information corresponding to the access port information included in the user authentication and registration information of the home base station;

a sending unit 402, which is configured to: send a registration permission message including the registration frequency information list of the current area to the home base station when determining that the current area of the home base station is a user registered area, or else, send a registration permission message including the public frequency;

an indicating unit 403, which is configured to: indicate the home base station to select the frequency in the registration permission message;

wherein the way of the selection may be automatic selection, or may be manual selection;

the rule for automatic selection may be a minimal interference criteria, that is, the home base station scans the reception levels of all frequencies, and takes the frequency with the minimal reception level as the selected object, or a threshold judgment criteria, that is, a threshold value of the reception level is set, and the reception levels of all frequencies are judged in turn, and the first frequency that satisfies the threshold value is taken as the selected object; and a second receiving unit 404, which is configured to: receive the feedback information of the selection result of the frequency by the home base station.

Figure 8:
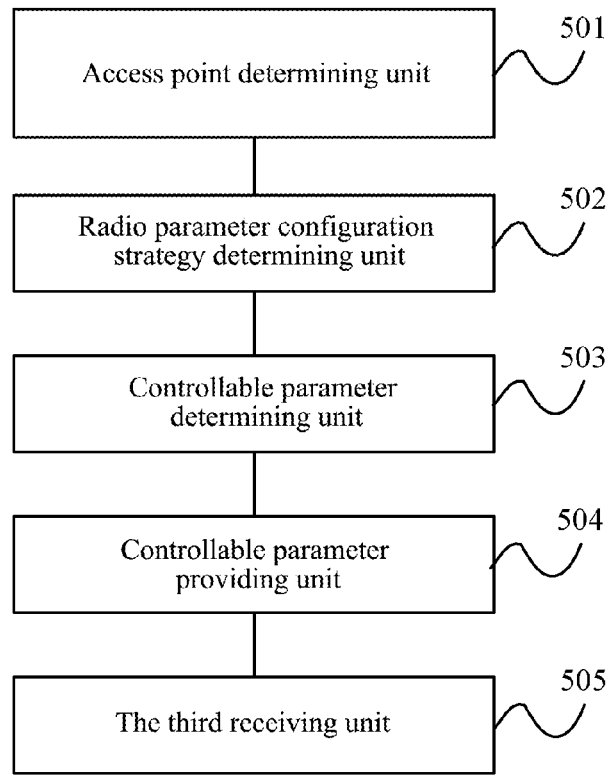
FIG. 8 is a schematic diagram of the structure of the radio parameter configuring module of the home base station management server according to the present invention.

Refer to FIG. 8, which is a schematic diagram of the structure of the radio parameter configuring module of the home base station management server according to the present invention, and the radio parameter configuring module 50 specifically comprises:

an access point judging unit 501, which is configured to: determine the access point of the home base station and the home gateway according to the configured frequency and the area position information corresponding to the access port information, so as to make the home base station establish an S1-C/U connection with the home gateway;

a radio parameter configuring strategy determining unit 502, which is configured to: determine the configuration strategy of the radio parameter of the home base station according to the frequency, area position information and the user subscription information;

wherein the configuration strategy of the radio parameter is: the range of transmission power of the home base station or the maximum transmission power of the terminal in the range of the service of the home base station, and so on;

a controllable parameter determining unit 503, which is configured to: determine the controllable parameter in the radio parameters according to the frequency, area position information and the user subscription information;

a controllable parameter providing unit 504, which is configured to: provide the controllable parameter to the user so as to make the user configure the controllable parameter;

wherein the controllable parameter may be provided to the user by a human-machine interaction interface, and the human-machine interaction interface displays the classification and control range of the controllable parameter, so as to make the user configure the controllable parameter; and a third receiving unit 505, which is configured to: receive the feedback information of the configuration result.

After the home base station management server transfers the parameter control to the home base station, the home base station needs to feed back the configuration result to the home base station management server no matter whether the home base station configures the parameter automatically or configures the parameter under the intervention of the user, and the configuration result fed back to the home base station management server includes: the connection point (access point) information between the home base station and the home gateway/mobility management element and information of successful configuration of other radio parameters.

In brief, the method of the present invention has the following characteristics.

1. The method of the present invention considers the access port information of the home base station, and during the process of the home base station accessing the network, the home base station management server judges whether to allow the access of the home base station according to the access port information. That is to say, the user may freely move the home base station as required by using the access method of the present invention and allow it to access the network, thereby changing the limitation caused by the existing home base station being fixed in one place for using and accessing the network. Whether the home base station is able to access the network may be taken as a service with a higher level provided by the network for the user. The meaning of whether the home base station is able to access the network is that the home base station equipment accesses the existing network by other network ports besides the access port of the registered fixed network and provides a corresponding wireless registration service.

2. The frequency selection range is wider, and two types of frequencies, i.e., the registration frequency and the public frequency, are provided to the home base station for configuration, but the frequency selection range is not limited to the frequency band stimulated a protocol. And the home base station may store the used frequencies for further selection.

3. The home base station management server may interact with the home base station, and the user is able to control the configuration of the radio parameter to make the configured parameter to be more suitable for requirements of the user and make the process of parameter configuration to be more flexible.

The above description is only preferred embodiments of the present invention, it is should be pointed out that a plurality of improvements and modifications may be made without departing from the principle of the present invention by those skilled in the art, and these improvements and modifications should be deemed to fall into the protection scope of the present invention.

INDUSTRIAL APPLICABILITY

The method for accessing a network by a home base station and the home base station management server determine whether to allow the access of the home base station according to user authentication and registration information, so as to make the user freely move the home base station as required and allow it to access the network, thereby changing the limitation caused by the existing home base station being fixed in one place for using and accessing the network; meanwhile, the frequency selection range is wider, and two types of frequencies, i.e., the registration frequency and the public frequency, are provided to the home base station for configuration, but the frequency selection range is not limited to the frequency band stimulated a protocol. And the home base station may store the used frequencies for further selection; in addition, the home base station management server may interact with the home base station, and the user is able to control the configuration of the radio parameter to make the configured parameter to be more suitable for requirements of the user and make the process of parameter configuration to be more flexible.

What is claimed is:

1. A method for accessing a network by a home base station, comprising:

a home base station management server receiving a registration request sent by the home base station through a communication link with the home base station;

the home base station management server judging whether to allow access of the home base station according to user authentication and registration information in the registration request; the user authentication and registration information including: a security key and access port information;

after allowing the access of the home base station, the home base station management server configuring a frequency of the home base station; and after finishing frequency configuration, the home base station management server configuring a radio parameter of the home base station.

2. The method according to claim 1, wherein the access port information includes: a home base station registration port list and user registration information of the home base station;

in the step of the home base station management server determining whether to allow access of the home base station according to user authentication and registration information in the registration request, and if the security key passes the authentication, and if an access port of the home base station is a registration port in the home base station registration port list or the user registration information indicates to allow access of other ports besides the registration port of the home base station, the access of the home base station is allowed.

3. The method according to claim 2, wherein the step that if the access port of the home base station is the registration port in the home base station registration port list or the user registration information indicates to allow access of other ports besides the registration port of the home base station, the access of the home base station is allowed, comprises:

the home base station management server judging whether the security key could pass the authentication, and if the security key could not pass the authentication, a process of authentication and registration ending; if the security key could pass the authentication, the home base station management server judging whether the access port of the home base station is the registration port, and if the access port of the home base station is the registration port, allowing the access of the home base station, if the access port of the home base station is not the registration port, the home base station management server judging the user registration information indicates whether to allow the access of the home base station by other port besides the registration port, and if the user registration information indicates to allow the access of the home base station by other port besides the registration port, allowing the access of the home base station, if the user registration information indicates not to allow the access of the home base station by other port besides the registration port, not allowing the access of the home base station.

4. The method according to claim 1, wherein the frequency includes: a registered frequency and a public frequency.

5. The method according to claim 4, wherein the step of configuring the frequency of the home base station comprises:
the home base station management server judging whether a current area where the home base station is located is a user registration area according to area position information corresponding to the access port information included in the user authentication and registration information of the home base station;
when determining that the current area of the home base station is the user registration area, the home base station management server sending a registration permission message including the registration frequency information list of the current area to the home base station;
when determining that the current area of the home base station is not the user registration area, the home base station management server sending a registration permission message including the public frequency to the home base station;
the home base station management server indicating the home base station to select the frequency in the registration permission message; and
the home base station management server receiving feedback information of a selection result for the frequency by the home base station.

6. The method according to claim 5, wherein when the home base station pre-stores a used frequency, the user authentication information further includes the used frequency, and after the step of the home base station management server sending the registration permission message including the registration frequency information list of the current area to the home base station, and before the step of the home base station management server indicating the home base station to select the frequency in the registration permission message, the method further comprises:
the home base station management server judging whether the used frequency is available in the current area, and if the used frequency is available in the current area, arranging the used frequency at front of the registered frequency information list.

7. The method according to claim 1, wherein the step of configuring the radio parameter of the home base station comprises:
the home base station management server determining an access point of the home base station and the home gateway according to the configured frequency and the area position information corresponding to the access port information, so as to make the home base station establish a control plane interface/user plane interface (S1-C/U) connection with the home gateway;
the home base station management server determining a configuration strategy of the radio parameter of the home base station according to the frequency, the area position information and user subscription information;
the home base station management server determining a controllable parameter in the radio parameters according to the frequency, the area position information and the user subscription information;
the home base station management server providing the controllable parameter to a user so as to make the user configure the controllable parameter; and
the home base station management server receiving a configuration result fed back by the home base station.

8. A home base station management server, comprising:
a first receiving module, which is configured to: receive a registration request sent by a home base station through a communication link between the home base station management serve and the home base station;
a judging module, which is configured to: judge whether to allow access of the home base station according to user authentication and registration information in the registration request; wherein the user authentication and registration information includes: a security key and access port information;
a frequency configuring module, which is configured to: configure a frequency of the home base station after allowing the access of the home base station; and
a radio parameter configuring module, which is configured to: configure a radio parameter of the home base station after completing configuration of the frequency.

9. The home base station management server according to claim 8, wherein the access port information includes: a home base station service closed user list and user registration information of the home base station;
the judging module is configured to:
if the security key passes authentication, and
if an access port of the home base station is a registration port in a home base station registration port list, or the user registration information indicates to allow access of other ports besides the registration port of the home base station, allow the access of the home base station.

10. The home base station management server according to claim 9, wherein the judging module comprises: a first judging unit, a second judging unit and a third judging unit;
the first judging unit is configured to: judge whether a security key could pass authentication; and if the security key could pass the authentication, the second judging unit operates, if the security key could not pass the authentication, a process of authentication registration ends;
the second judging unit is configured to: judge whether the access port of the home base station is the registration port, and if the access port of the home base station is the registration port, allow the access of the home base station, if the access port of the home base station is not the registration port, the third judging unit operates;
the third judging unit is configured to: judge whether the user registration information allows the home base station to access a network by other ports besides the registration port, and if the user registration information allows the home base station to access the network by other ports besides the registration port, execute the access, if the user registration information does not allow the home base station to access the network by other ports besides the registration port, do not allow the access of the home base station.

11. The home base station management server according to claim 8, wherein the frequency includes: a registered frequency and a public frequency.

12. The home base station management server according to claim 11, wherein the frequency configuring module comprises:
- a fourth judging unit, which is configured to: judge where a current area where the home base station is located is a user registered area according to area position information corresponding to the access port information included in the user authentication and registration information of the home base station;
- a sending unit, which is configured to: send a registration permission message including the registration frequency information list of the current area to the home base station when determining that the current area of the home base station is the user registered area, or send a registration permission message including the public frequency when determining that the current area of the home base station is not the user registered area;
- an indicating unit, which is configured to: indicate the home base station to select the frequency in the registration permission message; and
- a second receiving unit, which is configured to: receive feedback information of a selection result for the frequency by the home base station.

13. The home base station management server according to claim 8, wherein the radio parameter configuring module comprises:
- an access point judging unit, which is configured to: determine an access point of the home base station and the home gateway according to the configured frequency and the area position information corresponding to the access port information, so as to make the home base station establish a control plane interface/user plane interface (S1-C/U) connection with the home gateway;
- a radio parameter configuring strategy determining unit, which is configured to: determine a configuration strategy of the radio parameter of the home base station according to the frequency, the area position information and user subscription information;
- a controllable parameter determining unit, which is configured to: determine a controllable parameter in the radio parameters according to the frequency, the area position information and the user subscription information;
- a controllable parameter providing unit, which is configured to: provide the controllable parameter to a user so as to make the user configure the controllable parameter; and
- a third receiving unit, which is configured to: receive feedback information of a configuration result, wherein the configuration result includes: a connection point information of the (S1-C/U) connection and information of successful configuration of the controllable parameter by the user.

* * * * *